United States Patent [19]

Atwood

[11] 4,201,529
[45] May 6, 1980

[54] ADJUSTABLE CAM METERING FOR ROTATING TRAP TYPE DOUGH DIVIDER

[76] Inventor: Harold T. Atwood, 14151 Irving Ave., Dolton, Ill. 60419

[21] Appl. No.: 955,651

[22] Filed: Oct. 30, 1978

[51] Int. Cl.² ............................................. A21C 5/04
[52] U.S. Cl. .................................. 425/238; 74/568 R; 425/182
[58] Field of Search ............... 425/238, 239, 240, 241

[56] References Cited

U.S. PATENT DOCUMENTS

| 1,530,623 | 3/1925 | Smith | 425/239 |
|---|---|---|---|
| 1,954,501 | 4/1934 | Steere | 425/239 |
| 2,012,682 | 8/1935 | Johnson | 425/239 |
| 3,658,013 | 4/1972 | Neumann et al. | 425/238 |

Primary Examiner—Paul Lieberman
Assistant Examiner—A. H. Koeckert
Attorney, Agent, or Firm—Benjamin Schlosser

[57] ABSTRACT

The metering device comprises a roller having a plurality of parallel grooves spaced equidistantly around the circumference of the roller and extending across the entire width of the roller, and drive means for rotating the roller. The grooves are of uniform width and depth, and extend radially inwardly from the outer peripheral surface of the roller. A block of approximately the same width and length of each of the grooves is mounted for reciprocating movement in each of the grooves. As the roller is rotated each block is reciprocated radially of the roller within its groove by the interengagement of cam rollers projecting from each end of each block and cam tracks mounted adjacent opposite ends of the roller. Each groove is filled with dough when it is in its upper vertical position and its block is in its lowermost position within the groove. The dough is discharged from each groove on to a conveyor belt as the block within the groove is moved toward the periphery of the roller.

3 Claims, 8 Drawing Figures

400

ADJUSTABLE CAM METERING FOR ROTATING TRAP TYPE DOUGH DIVIDER

FIELD OF THE INVENTION

The present invention is concerned with adjustable means for receiving dough form a mass of dough contained in a hopper, and depositing it in strips of uniform size on a conveyor belt.

DESCRIPTION OF THE PRIOR ACT

The only prior act of which applicant is aware is the dough divider disclosed in the U.S. Pat. No. 3,311,068 granted Mar. 28, 1967, to the present applicant and Walter Jaeger as joint inventors.

SUMMARY OF THE INVENTION

This invention relates to means for feeding dough from a hopper into grooves extending across the width of a roller rotated below the discharge end of the hopper, a block for moving the dough out of each groove in strips of uniform size, means for reciprocating a block radially of the roller in each of the grooves, and adjustable means for limiting the reciprocating movement of each block in its groove.

DESCRIPTION OF THE PREFERRED EMBODIMENT

Figure 1:
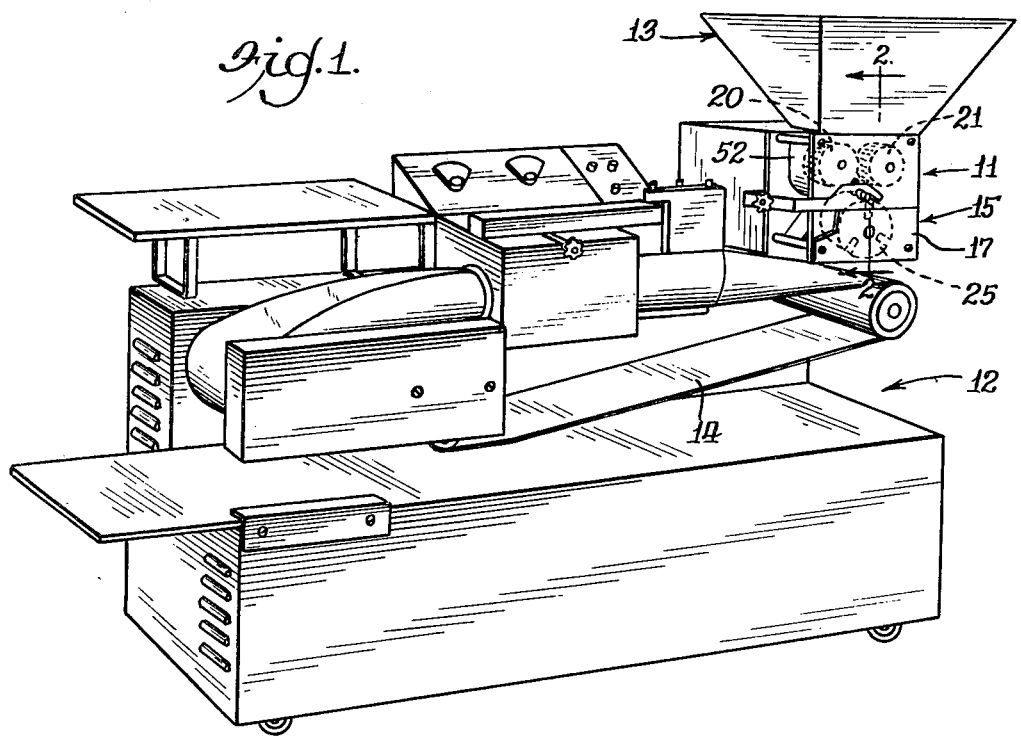
FIG. 1 is a perspective view showing the metering device positioned over the conveyor belt of a bagel forming machine.

As shown in FIG. 1, the metering device 11 is mounted at one end of a bagel forming machine 12 immediately below the open lower end of a hopper 13, and above a conveyor belt 14 that is adapted to carry the individual strips of dough through the bagel forming process. The bagel forming machine does not comprise part of the present invention and therefore will not be described in further detail.

Figure 4:
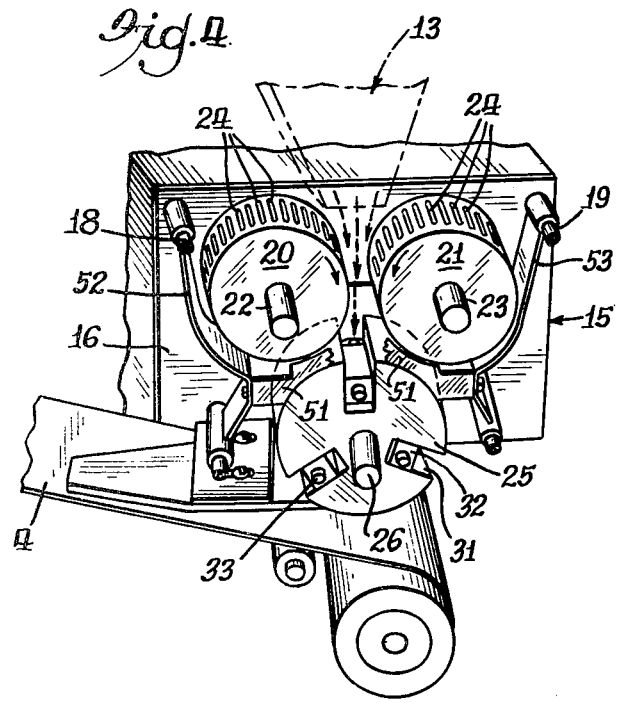
FIG. 4 is a perspective view of the metering device, with parts broken away to show the construction.
Figure 2:
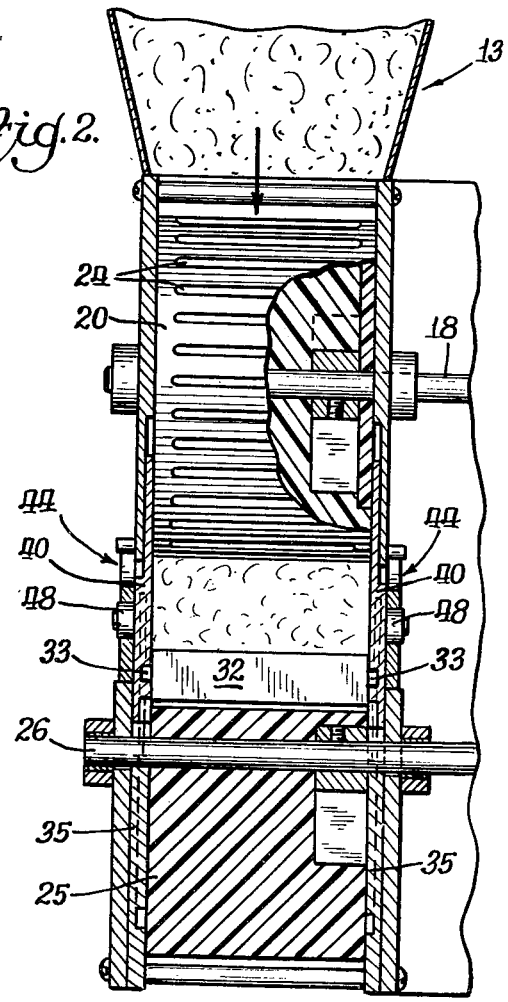
FIG. 2 is a vertical section view, taken along the line 2—2 of FIG. 1, showing the roller with one groove in position to receive dough from the hopper.

The metering device includes a housing 15 having an open top positioned directly below the open bottom of the hopper 13. The housing 15 comprises two parallel side plates 16 and 17 secured together in parallel relationship by any suitable connecting members, such as the rods 18 and 19. Two co-acting rollers 20 and 21 are rotatably mounted between the side plates by means of spindles 22 and 23 to which they are keyed. The spindles are driven in opposite directions by any suitable drive mechanism. As viewed in FIG. 4, the roller 20 is rotated in clockwise direction, and the roller 21 is rotated in counterclockwise direction. The spindles 22 and 23 are located so as to position the co-acting rollers 20 and 21 immediately below the open bottom of the hopper 13 with an opening between the rollers in vertical alignment with the open bottom of the hopper. The peripheral surfaces of the rollers 16 and 17 are roughened in any suitable manner, as indicated at 24, to enable the rollers to pull dough from the hopper downwardly through the space between the rollers.

Figure 8:
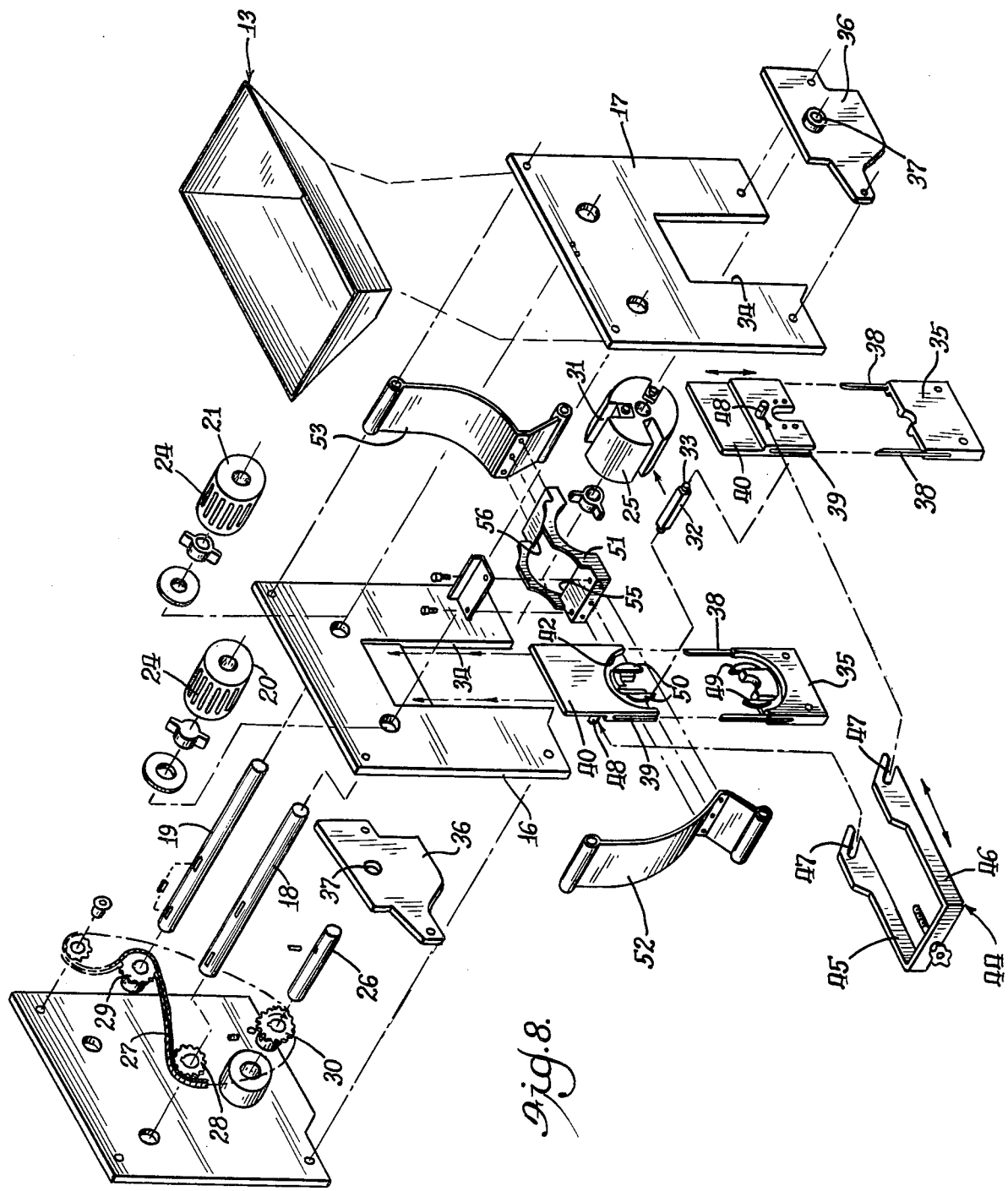
FIG. 8 is an exploded diagramatic detail view showing te various parts of the metering device.

A third roller 25 is keyed to a spindle 26 that is driven by any suitable drive mechanism, such as that shown diagrammatically in FIG. 8, in which a continuous chain 27 is entrained around gears 28, 29 and 30, keyed respectively to the spindles 22, 23 and 26. The spindle 26 is located below the spindles 22 and 23, and is spaced equidistantly from them, so that a line drawn between the axes of the spindles 22, 23 and 26 forms an equilateral triangle. The roller 25 is provided with a plurality of transversely extending parallel grooves 31 spaced equidistantly around the circumference of the roller and extending across the entire width of the roller. The grooves 31 are of uniform width, and extend radially inwardly from the outer peripheral surface of the roller a uniform distance that is less than the radius of the roller.

A block 32 of rectangular cross section is mounted in each groove, and is capable of reciprocating movement within the groove in radial relationship to the roller 25. The blocks 32 are of uniform size, and each extends the full length of the groove in which it is positioned. Each block is of approximately the same width as the grooves and has a cam roller 33 projecting from each end thereof. The cam rollers control the reciprocating movement of each block within its groove, as hereinafter described.

Each of the side plates 16 and 17 is provided with a wide slot 34 extending upwardly from its bottom edge. A lower cam plate 35 fitting within the lower portion of the slot is held in place by a plate 36 having an aperture 37 in which the spindle 26 is journalled. Each lower cam plate 35 has a pin 38 projecting upwardly from the upper edge of the plate adjacent the outer edges of a cam track hereinafter described. Each pin 38 fits in a vertical groove 39 provided in each vertical edge of an upper cam plate 40 to permit vertical sliding movement of the upper cam plates relative to the lower cam plates while maintaining the vertical alignment of the cam plates. It is obvious that the grooves 39 may be provided in the lower cam plates and the pins 38 may project downwardly from the upper cam plate.

Each lower cam plate has a groove 41 on its inner surface that forms the fixed lower portion of a cam track. Each upper cam plate has a complementary groove 42 that cooperates with the groove 41 to form a completely closed cam track 43 when the lower edge of the upper cam plate is adjacent the upper edge of the lower cam plate. The cam rollers 33 projecting from opposite ends of each block 32 extend into the cam tracks which guide the cam rollers in a closed path as the roller 25 is rotated, and thereby control the reciprocating movement of each block 32 within its groove 31. The reciprocating movement of each block radially of the roller 25 within its groove is limited by the position of the upper cam plates relative to the lower cam plates. The lower cam plates are fixed in position to cause each of the blocks to move into flush relationship with the peripheral surface of the roller 25 as the roller moves each groove past its lower vertical position.

A bifurcated member 44, mounted for horizontal sliding movement relative to the side plates 16 and 17, has a pair of arms 45 and 46 each provided with a diagonally extending slot 47. Each of the slots 47 engages a pin 48 projecting outwardly from each of the upper cam plates. The arms 45 are secured in place to hold the upper cam plates in any desired vertical position relative to the lower cam plates. The vertical position of the upper cam plates limits the reciprocating movement of each block 32 into its groove 31 as rotation of the roller 25 moves each groove past its upper vertical position. The horizontal movement of the arms 45 and 46 is restricted to insure engagement of the pins 38 with the grooves 39 in all positions of the upper cam plates.

When the upper cam plates 40 are moved vertically upwardly relative to the lower cam plates 35, a gap is created between the upper edge of each lower cam plate and the lower edge of the corresponding upper cam plate. In order to prevent the possibility of either of the cam rollers being displaced from its cam track, the cam plates are provided with overlapping guide plates 49 and 50 that cooperate to form a barrier to prevent such displacement. The guide plates 49 are secured to the inner surface of the lower cam plate adjacent the inner edges of the cam track at the upper edge of the lower cam plate, and project above said upper edge. The guide plates 50 are secured to the inner surface of the upper cam plate adjacent the inner edges of the cam track at the lower edge of the upper cam plate, and project below the lower edge of the upper cam plate. The guide plates 49 and 50 are offset relative to each other, and are of sufficient length to engage each other in juxtaposed face to face relationship in all positions of the upper cam plate. The cooperating guide plates close the inner edges of the cam track across the gap between the upper edge of the lower cam plate and the lower edge of the upper cam plate. The pins 38 are positioned adjacent the outer edges of the cam track and cooperate with the guide plates 49 and 50 to provide a completely closed cam track in all positions of the upper cam plate relative to the lower cam plate, and thus prevent displacement of the cam rollers 33 from the cam track as the cam rollers are moved across the gap between the cam plates.

An arcuately shaped member 51 mounted above the top portion of the roller 25 is supported at its ends by straps 52 and 53 depending from the rods 18 and 19, respectively. The center portion of the arcuately shaped member 51 is open, as indicated at 54, to permit dough, pulled downwardly from the hopper 13 by the rollers 20 and 21, to pass between the rollers 20 and 21 and into the groove 31 that is aligned vertically with the opening 54. The lateral ends of the opening 54 are defined by edges 55 and 56 that act as doctor blades to wipe any excess dough off the peripheral surface of the roller 25. This wiping action prevents any dough from riding around on the peripheral surface of the roller 25 and thus interfering with efficient operation of the metering device.

The amount of dough that is pushed into each groove 31 as it passes under the opening 54 is determined by the position of the block 32 within its groove. Each block 32 is reciprocated vertically within its groove by the interengagement of its cam rollers 38 with the cam tracks 43 as the roller 25 is rotated. The cam tracks are so located, relative to the roller 25, that each block 32 is in its innermost position within its groove 31 when the groove is in its upper vertical position. In this position, the open end of the groove is directly below the opening 54, and the dough from the hopper 13 is pushed downwardly into the groove by the pressure exerted on it by the rollers 20 and 21 as they are rotated in opposite directions.

When any groove 31 is in its upper vertical position and the roller 25 is rotated through 180°, the interengagement of the cam rollers 33 with the cam tracks 43 causes the block to be reciprocated within the groove from its innermost position within the groove to its outermost position, in which it is flush with the outer peripheral surface of the roller 25. In this outermost position each block discharges the dough from its groove in strips of uniform size. Upon continued rotation of the roller through another 180°, the interengagement of the cam rollers 33 with the cam tracks moves the block back into its innermost position within the groove.

Figure 5:
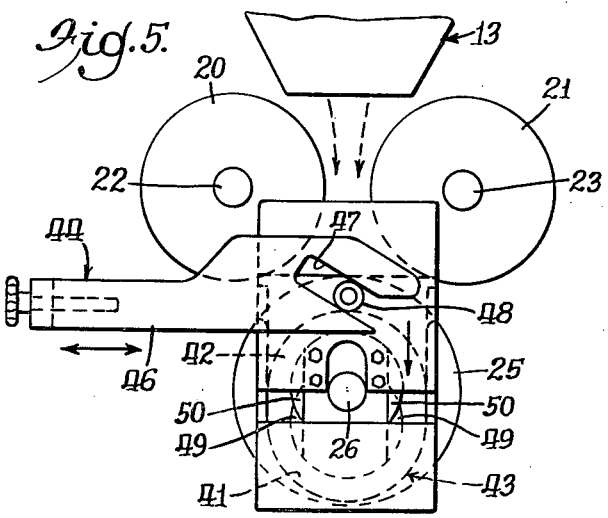
FIG. 5 is a schematic view showing the slidable member for adjusting the upper cam plate to limit the reciprocating movement of each block in its groove.
Figure 6:
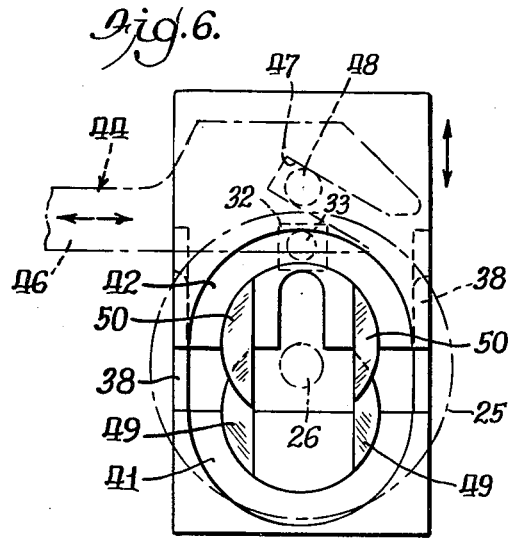
FIG. 6 is a view similar to FIG. 5, showing the slidable member in position to hold the upper cam plate in its uppermost position.
Figure 7:
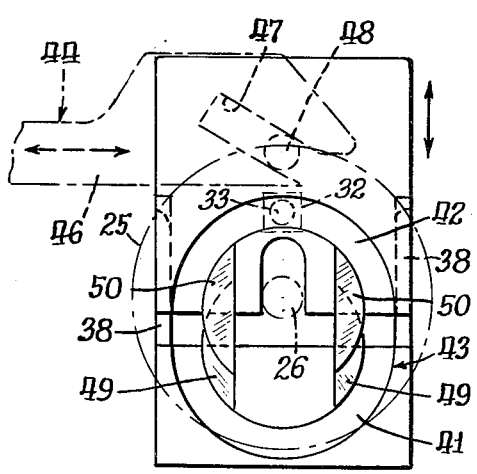
FIG. 7 is a view similar to FIG. 6, showing the slidable member in position to hold the upper cam plate in a lower position.
Figure 3:
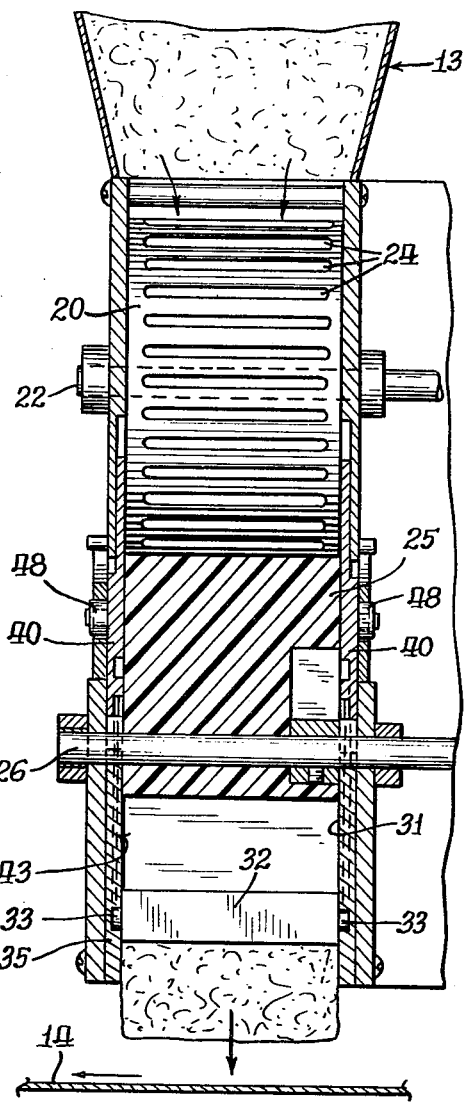
FIG. 3 is a view similar to FIG. 2, showing the roller with one groove in position to discharge the dough.

The reciprocating movement of each block within its groove is limited by the length of the cam tracks. The length of the cam tracks is controlled by the position in which the bifurcated member 44 is secured. Horizontal movement of the member 44 to the right, as viewed in FIG. 5, raises the upper cam plate relative to the lower cam plate, and thus decreases the distance the block can move inwardly in its groove. The length of the diagonal slot 47 will not permit the upper cam plate to move upwardly far enough to disengage the pins 38 from the slots 39. Since the blocks 32 are guided through identical paths by the cam tracks, each groove receives the same amount of dough as it is moved past the opening 54, and the strips of dough discharged by the blocks 32 in the lower vertical position of the grooves are of uniform size.

I claim:

1. A metering device for dough comprising a hopper having an open bottom, a pair of co-acting rollers rotatably mounted in spaced relationship below said open bottom, means for driving said rollers in opposite directions to pull dough from said hopper through the space between said rollers, a third roller rotatably mounted below the space between said co-acting rollers, means for driving said third roller, said third roller having transversely extending grooves in its peripheral surface for receiving uniform amounts of dough pulled downwardly between said co-acting rollers, a rectangular block fitting snugly within each of said grooves, a pair of cam rollers projecting from the opposite ends of each of said blocks, a pair of cam tracks adjacent each end of said third roller for receiving and guiding each of said cam rollers in a closed path as said third roller is rotated, each of said cam tracks comprising a lower cam plate having a groove on its inner surface forming a lower cam track and an upper cam plate in vertical alignment with said lower cam plate and having a groove on its inner surface forming an upper cam track, a pin projecting outwardly from the back surface of each of said upper cam plates, and a pair of arms each having a diagonally extending slot engaging one of said pins, said arms being movable horizontally to move said upper cam plates vertically relative to said lower cam plates.

2. A metering device as recited in claim 1, and having means for completely closing said cam tracks in all positions of said upper cam plates relative to said lower cam plates.

3. A metering device as recited in claim 2, in which said last mentioned means comprises a pair of vertically disposed pins positioned adjacent the outer edges of said cam tracks and pairs of cooperating guide plates projecting from the upper edges of said lower cam plates and the lower edges of said upper cam plates adjacent the inner edges of said cam tracks, said vertically disposed pins and guide plates each traversing the gap between said upper and lower cam plates when said upper cam plates are separated vertically from said lower cam plates, and said cooperating guide plates being offset relative to each other and of sufficient length to engage each other in juxtaposed face to face relationship in all positions of said upper cam plates.

* * * * *